(No Model.)

T. W. JENKINS.
DEVICE FOR FEEDING SHAVINGS, &c., TO FURNACES.

No. 307,552. Patented Nov. 4, 1884.

WITNESSES:
A. P. Grant,
W. F. Kircher

INVENTOR:
Thomas W. Jenkins,
BY Joan A. Biedersheim
ATTORNEY.

UNITED STATES PATENT OFFICE.

THOMAS W. JENKINS, OF PHILADELPHIA, PENNSYLVANIA.

DEVICE FOR FEEDING SHAVINGS, &c., TO FURNACES.

SPECIFICATION forming part of Letters Patent No. 307,552, dated November 4, 1884.

Application filed December 29, 1883. (No model.)

*To all whom it may concern:*

Be it known that I, THOMAS W. JENKINS, a citizen of the United States, residing in the city and county of Philadelphia, State of Pennsylvania, have invented a new and useful Improvement in Devices for Feeding Shavings, &c., to Furnaces, which improvement is fully set forth in the following specification and accompanying drawings, in which—

Figure 1:
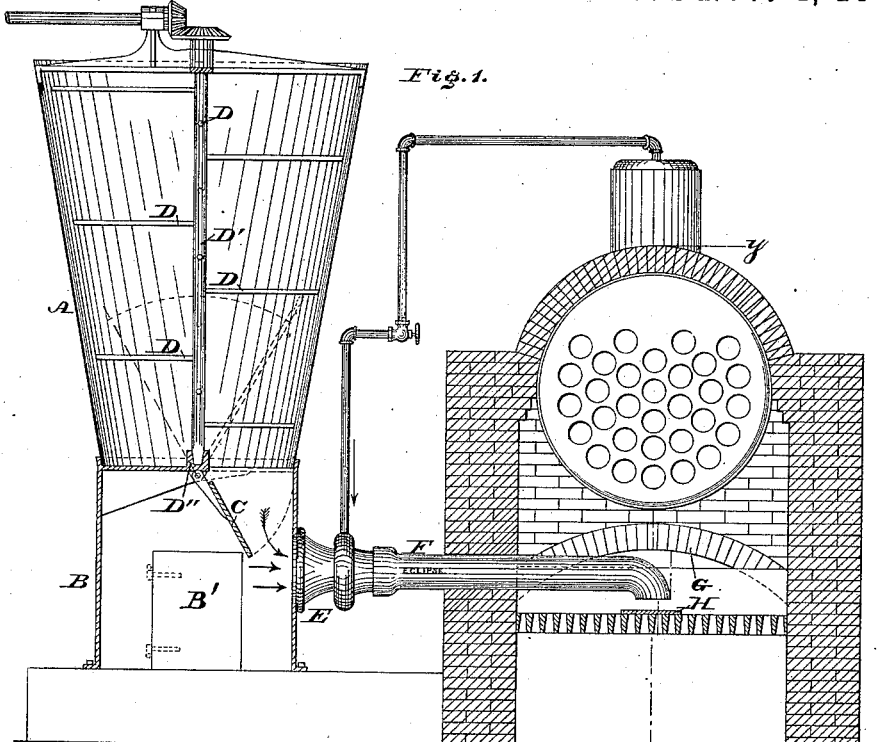
Figure 2:
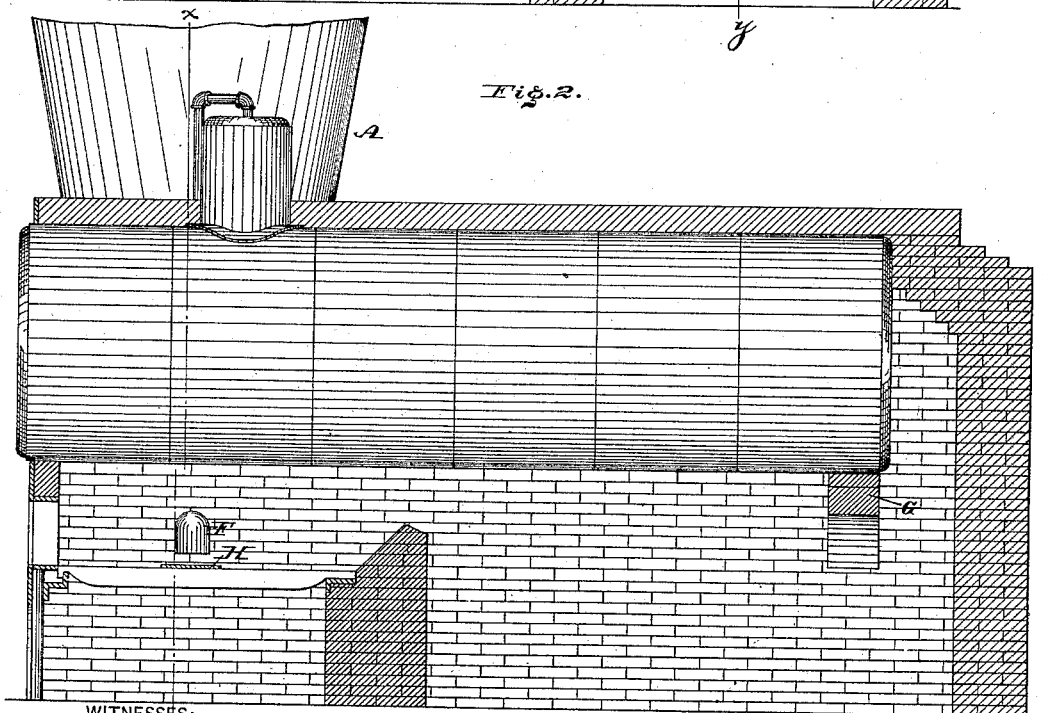

Figure 1 represents a vertical section of a burner for shavings, &c., embodying my invention in line $x\,x$, Fig. 2. Fig. 2 represents a vertical section thereof in line $y\,y$, Fig. 1.

Similar letters of reference indicate corresponding parts in the several figures.

My invention consists of a fuel-receiving hopper provided with a valve, in combination with a box communicating with said hopper, and an injector communicating with said box, said valve serving to direct the fuel to the injector and adjust the flow thereof.

It also consists of a combination with the furnace of a deflector and a depending wall, as will be hereinafter set forth and claimed.

Referring to the drawings, A represents a hopper which is open or partly open at the bottom, and properly supported over a box or chamber, B, with which it communicates, the hopper having at the bottom a valve or gate, C, whereby the communication with the box B may be opened or closed. Within the hopper is a series of paddles, vanes, or beaters, D, whose shaft D' is mounted on a step, D'', and rotated by any suitable power.

Attached to the box B is an injector, E, or generator of vapor of steam and air which is in communication with the box, and a conveying-pipe, F, the latter leading into a furnace, of which any desired form may be employed. The hopper is properly supplied with light fuel—such as shavings, sawdust, woodcuttings, &c.—and power imparted to the shaft D', so as to rotate the paddles D, thus preventing choking of the fuel. The gate C being open, permits the fuel to pass through the bottom outlet of the hopper and enter the box B, it being noticed that said gate is adapted to adjust the flow of the fuel, and may be set to direct the fuel toward the mouth of the injector E, said mouth being opened to admit air thereinto. A pipe leading from a suitable source of steam is connected with injector, and so that steam enters the injector and commingles with the air admitted thereinto in such manner as to generate a combustible vapor, which is forcibly impelled into the pipe F. The fuel reaching the mouth of the injector is drawn into the injector and pipe F, and conveyed by and with the vapor into the furnace, where both are burned, the combustion being rapid and more perfect than ordinary, whereby sparks and smoke are prevented and greater heat is attained. The fuel which fails to enter the injector drops into the box B, from whence it is removable through the door B', and may be thrown again into the hopper.

G represents an arch or wall, which depends from the furnace near the end of the same, adjacent to the flue, or at the extreme end of the combustion-chamber, thus forming a reverberatory furnace, serving as a check to the rapid discharge of the light fuel injected into the furnace, whereby as said fuel is retained a longer period of time in the furnace it is properly consumed, thus preventing sparks, consuming smoke, and intensifying the heat.

In order to prevent the fuel being forced through the grate, I employ a deflector, H, which is located on the grate below the discharge end of the conveying-tube, whereby as the fuel is impelled against the deflector it is diffused over the grate without liability of choking the grate-bars or packing thereon.

Having thus described my invention, what I claim as new, and desire to secure by Letters Patent, is—

1. A fuel-receiving hopper provided with a valve, in combination with a box communicating with said hopper, and an injector communicating with said box, said valve serving to direct the fuel to the injector and adjust the flow thereof, substantially as and for the purpose set forth.

2. A fuel-receiving hopper provided with a valve, in combination with a box communicating with said hopper, and an injector communicating with said box, said valve serving to direct the fuel to the injector and adjust the flow thereof, and said box having a door, B', substantially as and for the purpose set forth.

3. A fuel-receiving hopper and an injector, in combination with a furnace having a fuel-deflector located upon the grate thereof, and a depending wall within the combustion-chamber thereof, substantially as and for the purpose set forth.

THOS. W. JENKINS.

Witnesses:
JOHN A. WIEDERSHEIM,
CLARENCE B. WENGER.